Feb. 12, 1946.  T. L. FAWICK  2,394,675
CRANK CASE FOR INTERNAL-COMBUSTION ENGINES
Filed Jan. 30, 1942  2 Sheets-Sheet 1

INVENTOR.
Thomas L. Fawick
BY
Willard D. Eakin
ATTORNEY

Feb. 12, 1946. T. L. FAWICK 2,394,675
CRANK CASE FOR INTERNAL-COMBUSTION ENGINES
Filed Jan. 30, 1942 2 Sheets-Sheet 2

INVENTOR.
Thomas L. Fawick
BY
Willard D. Eakin
ATTORNEY

Patented Feb. 12, 1946

2,394,675

UNITED STATES PATENT OFFICE 2,394,675

CRANKCASE FOR INTERNAL-COMBUSTION ENGINES

Thomas L. Fawick, Akron, Ohio

Application January 30, 1942, Serial No. 428,851

7 Claims. (Cl. 121—194)

This invention relates to crank cases for internal combustion engines and methods of making the same. It is of especial value in quantity production of crank cases for the motors of aircraft, wherein lightness, strength, and accuracy of dimensions are of utmost importance.

Because of these requisites, and because the several portions of the crank case have to be thin but extensive in several directions, an inordinate amount of machining of large aluminum or steel forgings has been required in the procedure that has been for a long time, and still is, the general practice, in spite of the present urgent need for saving time, labor and shipping costs and for reducing waste of materials in machining operations.

The chief objects of this invention are economy of time and of labor, avoidance of the high cost of shipping large and heavy parts from city to city for the forging and machining operations, the reduction of the amount of machining waste, and the provision of accuracy, lightness and strength in the finished product.

Figure 1:
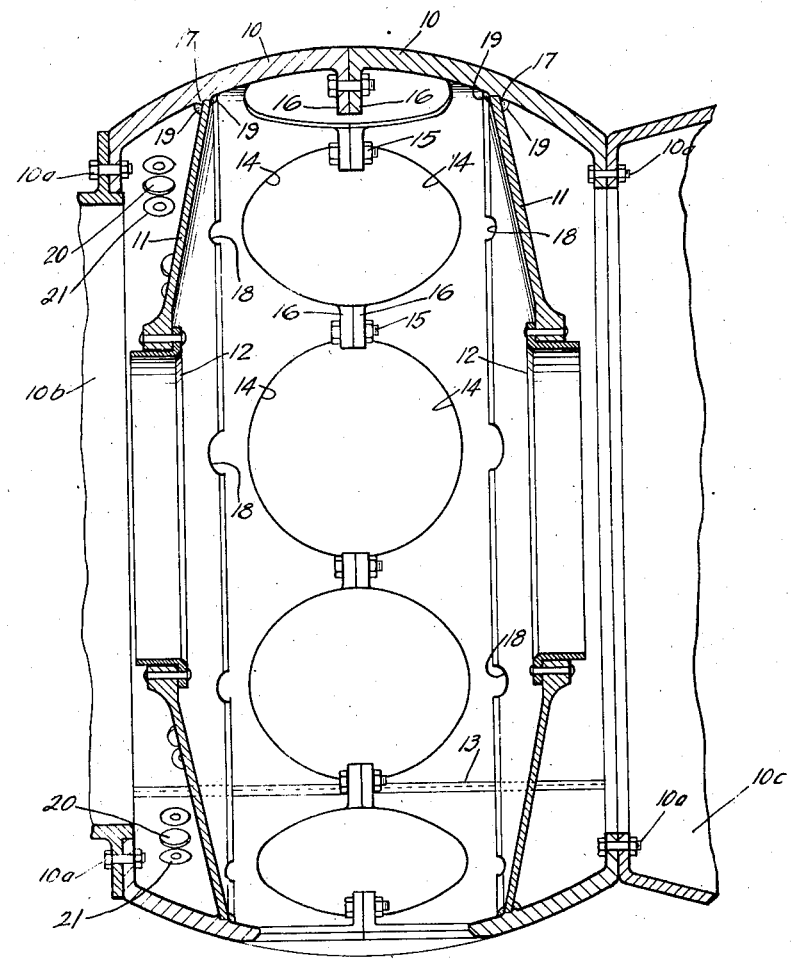
Fig. 1 is a fragmentary axial section of a crank case, for a single bank of cylinders, embodying and made in accordance with my invention in its preferred form.

Referring first to Fig. 1, the crank case there shown comprises two annular, somewhat bell-shaped, outer members 10 and two centrally apertured, disc-like, conical, bearing-support members 11, 11, which have mounted in their central apertures flanged, annular seating members 12, 12 for the crank-shaft bearings, the members 10 being adapted to be secured as by bolts 10ª, 10ª to a reduction gear and propeller-bearing housing 10ᵇ and to an engine support 10ᶜ, respectively.

Heretofore the crank case, having portions corresponding to the four members 10, 10 and 11, 11, have been made, integral with each other, by machining of a single metal forging, and it is manifest from contemplation of the final shape of such a member that the machining job is expensive, being wasteful of time, labor, material, and shipping costs.

In the practice of my invention each of the members 10 is hot-rolled to approximately its final channeled cross-sectional form, in straight lengths, but with allowance for the relatively small amount of machining required. In this rolling operation each of the straight lengths can be long enough to provide one or several of the members 10. A single unit of the channeled stock of such length as to provide one of the members 10 being thus provided, it is then rolled to circular form and made endless by welding as at 13.

Each is then formed with semicircular notches or half-holes 14, 14 in its margin of larger diameter, as by burning or "cutting" with a flame torch, with allowance for a relatively small amount of machining, to provide holes for the mounting of the engine cylinders when two of the members 10 are secured together as shown, by bolts 15, 15, extending through holes bored in lugs 16, 16 which are the remaining portions, after the hole cutting operation, of annular internal flanges which are formed on the members 10 in the rolling operations.

Before the members 10 are thus bolted together, however, they are sized in suitable dies, and each has mounted in it one of the bearing-support disc-like members 11.

Each of the members 11 is made by forging a billet which preferably has its greatest dimension in the direction of the blows of the hammer, for providing a pronounced radial grain in the metal for the sake of strength. After they are hammered approximately to size and shape the members are brought to a closer approximation of their final conical form by pressing them in dies, after which they are centrally bored for reception of the bearing seats 12 and are machined at their outer peripheries to fit within the respective members 10 and against respective annular shoulders 17, 17 formed on the inner faces of the members 10.

Because the outer diameter of each member 11 is greater than the inner diameter of the flange of which the lugs 16 are residual parts, each member 11 is notched as at 18, 18 to permit it to be inserted in the member 10, from the larger end of the latter, in spite of the presence of the lugs 16.

The members 11, being mounted in the respective members 10, are then secured in place by welding, at 19, 19, after which the assemblies comprising the members 10, 11 and 12 are bolted to each other, the cylinder holes providing access for the bolting operation.

Holes 20 for the valve push-rods and apertured flats 21 for the mounting of the push-rod guides can be formed at any suitable stage.

Such machining as may be desirable is performed at suitable stages of the procedure but it is manifest that but very little machining is required as compared with the procedure heretofore employed, as above described, with the result that great economy of time, labor, material and shipping costs is provided.

Figure 2:
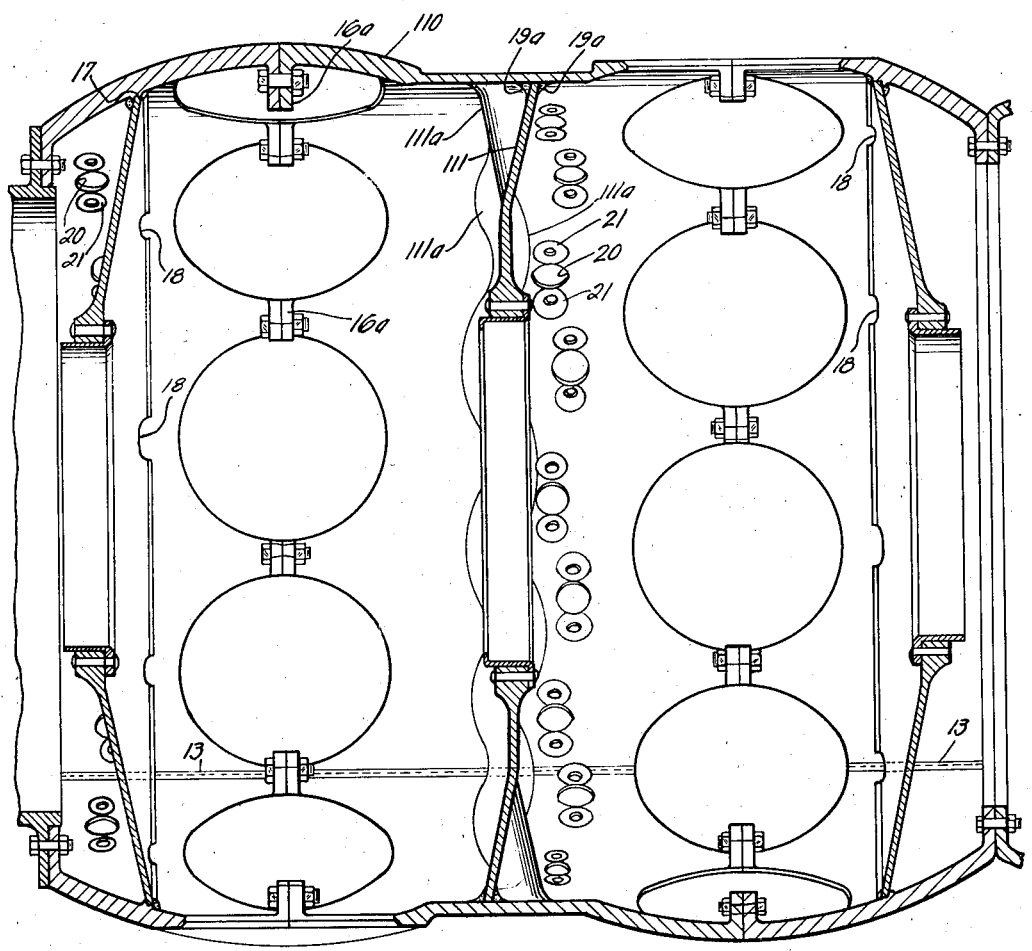
Fig. 2 is a fragmentary axial section of a crank case, for two banks of cylinders, embodying and made in accordance with my invention in its preferred form.
Figure 3:
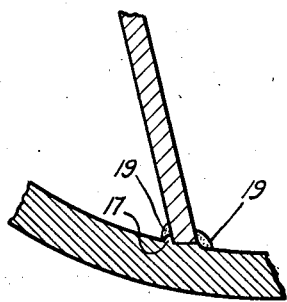
Fig. 3 is a fragmentary section, on a larger scale, of parts shown in Figs. 1 and 2.

The assembly shown in Fig. 2 corresponds substantially to that shown in Fig. 1, except that, for two banks of cylinders, the radially outer portion of the case comprises two members, 10, 10, corresponding to the members 10 of Fig. 1, and between them a member 110 suitably formed, by corresponding procedure, to mate with the members 10 embracing it.

Each of the members 10 of Fig. 2 has mounted in it a conical, disc-like, bearing-support member 11, made and mounted in the same way as in Fig. 1, and at its middle the member 110 has a somewhat similar member, 111, mounted in it in the same way except that the member 111 is fluted in its radially outer portion, with the flutes, 111a, 111a, of increasing depth toward its outer periphery, and is held in place by welding shown at 19a, 19a, on both sides of its outer margin, the fluting thus providing a high degree of strength. As the sinuous welds 19a provide strong anchorage of the member 111 to the member 110 a sinuous shoulder on the latter is not required and consequently the member 110 can be economically formed by substantially the same rolling operations and further procedure that are above described as to the members 10 of Fig. 1.

As the member 111 fits against a cylindrical inner face of the member 110 which is of substantial width and as the latter's lugs, 16a, 16a, are a considerable distance apart, the member 111 can be mounted in the member 110 without being formed with notches in its outer margin.

The invention provides the advantages that are set out in the above statement of objects and other modifications are possible without sacrifice of all such advantages and without departure from the scope of the appended claims.

I claim:

1. An engine crank-case comprising a middle annular radially-outer metal shell member, a pair of annular metal shell members embracing and secured to the same, and metal bearing-support members secured to each of the three said shell members.

2. An engine crank-case comprising a middle annular radially-outer metal shell member, a pair of annular metal shell members embracing and secured to the same, and metal bearing-support members secured to each of the three said shell members, each of the shell members being of rolled-metal and each of the bearing-support members being of radially-grained metal.

3. An engine crank-case comprising a middle annular radially-outer metal shell member, a pair of annular metal shell members embracing and secured to the same, and metal bearing-support members secured to each of the three said shell members, each of the shell members being of rolled-metal and having an integral internal flange at each of its margins.

4. An engine crank-case comprising a middle annular radially-outer metal shell member, a pair of annular metal shell members embracing and secured to the same, and metal bearing-support members secured to each of the three said shell members, each of the bearing-support members being of radially-grained metal.

5. An engine crank-case comprising a middle annular radially-outer metal shell member, a pair of annular metal shell members embracing and secured to the same, and metal bearing-support members secured to each of the three said shell members, at least one of the bearing-support members being radially fluted.

6. A crank-case for an internal combustion engine, said crank-case comprising a pair of rolled-metal annular shell members, a radially-grained metal bearing-support member mounted in and secured to an inner face of each of the shell members, and means securing an annular margin of one of the shell members to an annular margin of the other shell member.

7. A crank-case sub-assembly for an internal combustion engine, said sub-assembly comprising an annular, rolled-metal shell member having an internal face of channel form, and a radially grained metal bearing-support member mounted within the channel of the shell member and secured to a part of the said face of channel form.

THOMAS L. FAWICK.